United States Patent [19]

Taniguchi et al.

[11] Patent Number: 4,835,023

[45] Date of Patent: May 30, 1989

[54] ORNAMENTAL ARTICLES HAVING COATING MEMBRANE

[75] Inventors: Takashi Taniguchi, Yasu; Hiroshi Hosono, Otsu; Itaru Nakamura, Tokyo, all of Japan

[73] Assignee: Toray Industries, Inc., Tokyo, Japan

[21] Appl. No.: 880,748

[22] Filed: Jul. 1, 1986

[30] Foreign Application Priority Data

Jul. 2, 1985 [JP] Japan ................................ 60-145255
Aug. 26, 1985 [JP] Japan ................................ 60-185900

[51] Int. Cl.[4] ......................... B05D 5/06; B32B 33/00; C09D 5/29; C09D 5/36

[52] U.S. Cl. .......................................... 428/15; 63/32; 427/157; 427/218; 427/219; 427/220; 427/221; 427/386; 427/387; 428/404; 428/405; 428/413; 428/447; 428/542.2; 428/690; 523/171; 8/523

[58] Field of Search .................... 63/32; 427/157, 218, 427/219, 220, 221, 386, 387; 8/523; 428/15, 404, 405, 413, 447, 542.2, 690; 523/171

[56] References Cited

U.S. PATENT DOCUMENTS

| | | | |
|---|---|---|---|
| 1,254,791 | 1/1918 | Ganzinotti | 428/15 |
| 2,767,434 | 10/1956 | Fortune | 428/489 |
| 3,075,906 | 1/1963 | Chow | 428/15 |
| 3,099,574 | 7/1963 | Bernier | 427/218 |
| 3,125,484 | 3/1964 | Weiss | 428/248 |
| 3,539,379 | 11/1970 | Mayer | 428/15 |
| 3,793,047 | 2/1974 | Massenhausen . | |
| 4,162,348 | 7/1979 | Juyu et al. | 427/218 |
| 4,183,980 | 1/1980 | Nielsen | 427/215 |
| 4,544,415 | 10/1985 | Franz | 428/405 |

FOREIGN PATENT DOCUMENTS

| | | |
|---|---|---|
| 55993 | 5/1973 | Australia . |
| 183638 | 4/1983 | Japan . |
| 2011277 | 7/1979 | United Kingdom . |

*Primary Examiner*—James C. Cannon
*Attorney, Agent, or Firm*—Birch, Stewart, Kolasch & Birch

[57] ABSTRACT

An ornamental article comprising a natural ornamental material such as pearl and a cured coating membrane of a composition based on organic materials which is coated on the surface of said natural ornamental material in a thickness from 0.01 $\mu m$ to 30 $\mu m$, with improved properties such as surface luster and resistivity to scratch, light, chemicals, etc.

14 Claims, No Drawings

ORNAMENTAL ARTICLES HAVING COATING MEMBRANE

BACKGROUND OF THE INVENTION

1. Field of the Invention

This invention is concerned with ornamental articles having high resistivity to scratching, light, attack by various chemicals, etc. More particularly, it relates to natural or cultured pearls having such high resistivity which are suitable for use in necklaces, chokers, finger rings, brooches, ear rings, necktie pins, cuff buttons and the like.

2. Description of the Prior Art

Few of naturally occurring products can directly be used as ornamental articles. Such products are often subjected to various processes, such as cutting, grinding and boring, depending on their applicable use, their forms and other conditions when produced or found in nature, etc.

Pearls are used as ornamental articles. Purely naturally occurring pearls yield poorly. Most pearls are produced by seeding nuclei to host shellfish, such as pearl oysters, and growing square cylindrical layers, pearl layers or the like in a concentrical configuration. Improved methods of producing such cultured pearls have been proposed: for example, Japanese Patent Application Laid-open No. 59-183638.

An improvement of the quality of cultured pearls has already been attempted and put to practice by coating pearls with an acrylic thermoplastic resin. However, there has not yet been known a technique of making hard coatings on the surface of pearls while maintaining their color tone and luster which are characteristic to naturally occurring products. Thus, ornamental materials such as pearls still involve an inevitable drawback in that they are readily scratched.

On the other hand, particularly with respect to pearls, the survival rate of host shellfish has improved and pearls of good quality may now be obtained, by the recent progress techniques of pearl production by cultivation. However, there has still been problem of damage caused by the contamination of sea water.

If host shellfish are taken up from sea water after a short period immersion so as to improve the survival rate of the shellfish, the pearls thus obtained are poor in luster due to the thin pearl layer and do not have the characteristic pearl color. Conventionally, such pearls are dyed or coated with a thermoplastic resin in order to improve the poor quality. However, such dye or coating membranes exhibit poor resistance to acids, are discolored during use, or are easily scratched or even removed upon collision with metals or the like due to their poor hardness.

Such problems as described above have also been found in other ornamental materials, such as corals.

SUMMARY OF THE INVENTION

This invention has been made to overcome the foregoing drawbacks in the prior art and it is an object thereof to provide ornamental articles of natural or cultured high quality material, for example, pearl or coral, with improved properties such as surface luster and resistivity to scratch, light, chemicals, etc., by means of an outermost layer having high hardness.

DESCRIPTION OF THE PREFERRED EMBODIMENTS

This invention relates to ornamental articles having excellent resistivity to scratch, light, chemicals, and the like, particularly to pearls or the like which further exhibit improved luster, as well as to a process for the production of such articles.

This invention provides an ornamental article comprising a natural ornamental material and a coating membrane of a curable composition based on organic materials which is coated on the surface of said natural ornamental material in a thickness from 0.01 μm to 30 μm.

Various kinds of materials may be used as the natural ornamental materials in the invention, so long as a coating membrane can be applied onto the surface of those materials. Such materials include, for example, pearl and coral, but are not limited to these. Particularly, pearls are suitable materials for this invention in view of their surface hardness and chemical resistance. "Natural materials" referred to herein include those having been more or less, artificially treated in some step of production thereof, for example, cultured pearls. However, pearls artificially obtained by glueing guanines to glass beads are excluded from the natural materials.

In the case of natural or cultured pearls, it is particularly preferable for them to be preliminarily bleached with hydrogen peroxide or the like before applying a coating membrane according to this invention, for the purpose of increasing the luster and opaqueness and improving adhesion with the coating membrane.

According to this invention, a curable composition based on organic materials is coated on the surface of such a natural ornamental material. Any curable composition may be used in this invention so long as it can form threedimensional crosslinking. Thermosetting materials are particularly preferred since they can be cured uniformly and easily.

Preferable examples of these curable compositions include monomers, oligomers or prepolymers having polyfunctional acrylic group, melamine resins, epoxy resins, polyurethane resins and the like. Polyurethane resins include urethane-forming compositions comprising aliphatic, cycloaliphatic or aromatic isocyanates and polyols, as well as various kinds of modified resins capable of radical curing by the introduction of double-bonds to the above-mentioned compounds. Further, organopolysiloxane type compounds obtained from organic-substituted silicon compounds can also be suitably used.

Particularly, when the ornamental material is natural or cultured pearl, the coating membrane preferably comprises the following ingredients A and B;

A. Silicon compounds represented by the following general formula (I) and/or hydrolysates thereof:

$$R^1{}_aR^2{}_bSi(OR^3)_{4-(a+b)} \quad (I)$$

where $R_1$ and $R^2$ independently represent an alkyl group, alkenyl group, aryl group or hydrocarbyl group containing halogen, epoxy group, glycidoxy group, amino group, mercapto group, methacryloxy group or cyano group, $R^3$ represents $C_{1-8}$ alkyl group, alkoxyalkyl group, acyl group or aryl group, and a and b represent 0 or 1, respectively.

B. Epoxy resin compound.

Typical examples of the silicon compounds represented by the foregoing formula (I) used as the ingredient A in this invention include tetra alkoxy silanes, such as methyl silicate, ethyl silicate, n-propyl silicate, isopropyl silicate, n-butyl silicate, sec-butyl silicate and t-butyl silicate, and hydrolysates thereof, trialkoxysilanes, triacyloxysilanes or triphenoxysilanes such as methyltrimethoxysilane, methyltriethoxysilane, methyltrimethoxyethoxysilane, methyltriacetoxysilane, methyltributoxysilane, ethyltrimethoxysilane, ethyltriethoxysilane, vinyltrimethoxysilane, vinyltriethoxysilane, vinyltriacetoxysilane, vinyltrimethoxyethoxysilane, phenyltrimethoxysilane, phenyltriethoxysilane, phenyltriacetoxysilane, γ-chloropropyltrimethoxysilane, γ-chloropropyltriethoxysilane, γ-chloropropyltriacetoxysilane, 3,3,3-trifluoropropyltrimethoxysilane, γ-methacryloxypropyltrimethoxysilane, γ-aminopropyltrimethoxysilane, γ-aminopropyltriethoxysilane, γ-mercaptopropyltrimethoxysilane, γ-mercaptopropyltriethoxysilane, N-(β-aminoethyl)-γ-aminopropyltrimethoxysilane, β-cyanoethyltriethoxysilane, methyltriphenoxysilane, chloromethyltrimethoxysilane, chloromethyltriethoxysilane, glycidoxymethyltrimethoxysilane, glycidoxymethyltriethoxysilane, α-glycidoxyethyltrimethoxysilane, α-glycidoxyethyltriethoxysilane, β-glycidoxyethyltrimethoxysilane, β-glycidoxyethyltriethoxysilane, α-glycidoxypropyltrimethoxysilane, α-glycidoxypropyltriethoxysilane, β-glycidoxypropyltrimethoxysilane, β-glycidoxypropyltriethoxysilane, γ-glycidoxypropyltrimethoxysilane, γ-glycidoxypropyltriethoxysilane, γ-glycidoxypropyltripropoxysilane, γ-glycidoxypropyltributoxysilane, γ-glycidoxypropyltrimethoxyethoxysilane, γ-glycidoxypropyltriphenoxysilane, α-glycidoxybutyltrimethoxysilane, α-glycidoxybutyltriethoxysilane, β-glycidoxybutyltrimethoxysilane, β-glycidoxybutyltriethoxysilane, γ-glycidoxybutyltrimethoxysilane, γ-glycidoxybutyltriethoxysilane, δ-glycidoxybutyltrimethoxysilane, δ-glycidoxybutyltriethoxysilane, (3,4-epoxycyclohexyl)methyltrimethoxysilane, (3,4-epoxycyclohexyl)methyltriethoxysilane, β-(3,4-epoxycyclohexyl)ethyltrimethoxysilane, β-(3,4-epoxycyclohexyl)ethyltriethoxysilane, β-(3,4-epoxycyclohexyl)ethyltripropoxysilane, β-(3,4-epoxycyclohexyl)ethyltributoxysilane, β-(3,4-epoxycyclohexyl)ethyltrimethoxyethoxysilane, β-(3,4-epoxycyclohexyl)ethyltriphenoxysilane, γ-(3,4-epoxycyclohexyl)propyltrimethoxysilane, γ-(3,4-epoxycyclohexyl)propyltriethoxysilane, δ-(3,4-epoxycyclohexyl)butyltrimethoxysilane, δ-(3,4-epoxycyclohexyl)butyltriethoxysilane, or the hydrolyzates thereof, as well as dialkoxysilanes, diphenoxysilanes or diacyloxysilanes such as dimethyldimethoxysilane, phenylmethyldimthoxysilane, dimethyldiethoxysilane, phenylmethyldiethoxysilane, γ-chloropropylmethyldimethoxysilane, γ-chloropropylmethyldiethoxysilane, dimethyldiacetoxysilane, γ-methacryloxypropylmethyldimethoxysilane, γ-methacryloxypropylmethyldiethoxysilane, γ-mercaptopropylmethyldimethoxysilane, γ-mercaptopropylmethyldiethoxysilane, γ-aminopropylmethyldimethoxysilane, γ-aminopropylmethyldiethoxysilane, methylvinyldimethoxysilane, methylvinyldiethoxysilane, glycidoxymethylmethyldimethoxysilane, glycidoxymethylmethyldiethoxysilane, α-glycidoxyethylmethyldimethoxysilane, α-glycidoxyethylmethyldiethoxysilane, β-glycidoxyethylmethyldimethoxysilane, β-glycidoxyethylmethyldiethoxysilane, α-glycidoxypropylmethyldimethoxysilane, α-glycidoxypropylmethyldiethoxysilane, β-glycidoxypropylmethyldimethoxysilane, β-glycidoxypropylmethyldiethoxysilane, γ-glycidoxypropylmethyldimethoxysilane, γ-glycidoxypropylmethyldiethoxysilane, γ-glycidoxypropylmethyldipropoxysilane, γ-glycidoxypropylmethyldibutyoxysilane, γ-glycidoxypropylmethyldimethoxyethoxysilane, γ-glycidoxypropylmethyldiphenoxysilane, γ-glycidoxypropylethyldimethoxysilane, γ-glycidoxypropylethyldiethoxysilane, γ-glycidoxypropylethyldipropoxysilane, γ-glycidoxypropylvinyldimethoxysilane, γ-glycidoxypropylvinyldiethoxysilane, γ-glycidoxypropylphenyldimethoxysilane, γ-glycidoxypropylphenyldiethoxysilane, or hydrolysates thereof.

Two or more of these compounds can be added together. Particularly, the organic silicon compound containing epoxy group and glycidoxy group is preferable for the purpose of providing dyeability.

The epoxy resin compounds of the ingredient B include those compounds which are generally used for paint and casting: for example, polyolefinic epoxy resins synthesized by the peroxidation process; cycloaliphatic epoxy resins such as cyclopentadiene oxide, cyclohexene oxide and polyglycidyl esters obtained from hexahydropthalic acid with epichlorohydrin; polyglycidyl ethers obtained from polyvalent phenols, such as bisphenol A, catechol and resorcinol, or polyfunctional alcohols, such as (poly)ethylene glycol, (poly)propylene glycol, neopentyl glycol, glycerin, trimethylolpropane, pentaerythritol, diglycerol, and sorbitol, with epichlorohydrin; epoxidized vegetable oils; epoxy novolaks obtained from novolak phenol resin and epichlorohydrin; epoxy reins obtained from phenolphthalein and epichlorohydrin; and copolymers of glycidyl methacrylate with acrylic monomer such as methylmethacrylate or styrene.

Particularly, cycloaliphatic epoxy resins and epoxy resins having aromatic rings are preferred in view of sweat-resistance and water proofness.

The curable composition in this invention can contain non-crosslinking materials, inorganic compounds and other curable materials within such a range as not significantly reducing the coating performance and the transparency. Various physical properties such as adhesion with pearls, chemical resistivity, surface hardness, durability and dyeability can be improved by the combination of these additives.

The preferable examples of the organic materials described above include vinyl copolymers including acrylic types, polyester polymers, including alkyd resins and cellulose polymers. the inorganic materials can include metal alkoxides represented by the following general formula (II);

$$M(OR)_c \quad (II)$$

where R represents a alkyl group, acyl group or alkoxyalkyl group, M represents silicon, titanium, zirconium, antimony, tantalum, germanium or aluminium, and c represents the same value as the valence of the metal M, and/or hydrolysates thereof, and finely particulate metal oxides, particulaly, colloidaly dispersed sols thereof.

Preferable examples of colloidally dispersed sols may include, for example, silica sol, titania sol, zirconia sol, antimony oxide sol and alumina sol. Particularly, silica sol is preferable for the improvement of the adhesion to the substrate pearls, and titania sol or antimony oxide sol is preferable for the improvement of the refractive index of coating membrane, that is, for the improvement of the luster due to the increase of light reflection at the surface.

Reference is then made to the method of coating a natural material with the curable composition and curing the composition in this invention. The surface of the natural material is coated with the composition in liquid form, and then the composition is cured.

The liquid composition can be applied to the ornamental material by any coating means employed in the ordinary coating works, and it is preferably carried out, for example, by dip coating, curtain coating and float coating with air or gas stream. In the latter case, the coated material is dried as it is floating. Further, when the ornamental material such as a pearl is bored in the fabrication step, they are preferably supported by a supporting means (e.g., a jig) at the bored holes and then coated by dip coating.

The coating composition thus coated can be cured by the action of a curable functional group, for example, double bonds in the polymer or oligomer, which are curable by radiation such as ultraviolet, electron ray and gamma radiation.

However, heat curing is particularly preferable for the entire and uniform curing in this invention. The heating can be carried out, for example, by hot blow, infrared ray and the like. The usable heating temperature ranges generally from room temperature to 150° C., and more preferably, from 40° to 120° C., while depending on the insufficient at the lower temperature, and heat decomposition or cracking result at the higher temperature.

In case that the silicon compound of the ingredient A is cured by heating, the hydrolysate is preferably used in order to carry out the curing more entirely with lower curing temperature.

The hydrolysates are produced by adding to the material purified water or an aqueous solution of hydrochloric acid, acetic acid or sulfuric acid, and stirring. Further, the degree of hydrolysis can be easily controlled by adjusting the addition amount of water or acid solution. For hydrolysis, it is particularly preferable to add purified water or an aqueous acidic solution in an amount of from 1 to 3 times by mole greater than the molar amount of the $—OR^3$ groups in the general formula (I) in view of the promotion of curing.

While the hydrolysis can be carried out in the absence of any solvent since alcohol or the like is formed during hydrolysis, it is also possible carry out hydrolysis after mixing an organic silicon compound with a solvent in order to perform the hydrolysis more uniformly. Further, it is also possible to use the hydrolysate from which an appropriate amount of alcohol or the like produced during hydrolysis has been removed by heating and/or reducing pressure depending on the purposes, or an appropriate solvent may be added after the hydrolysis. The examples of abovementioned solvents include alcohols, esters, ethers, ketones and halogenated hydrocarbons or aromatic hydrocarbons such as toluene and xylene. These solvents can be also used in a mixture of two or more if required. Furthermore, it is also possible to promote the hydrolyzing reaction or other reactions, such as preliminary condensation, by heating to temperatures higher than room temperature depending on the purposes. Alternatively, it is of course possible to carry out the hydrolysis while maintaining the reactants at temperatures lower than room temperature in order to suppress the preliminary condensation.

The amount of the ingredient A and B used in this invention are preferably from 1 to 1000 parts by weight of ingredient B based on 100 parts by weight of ingredient A in view of the surface hardness, water proofness and the like, although it should be determined depending on the curing conditions, the quality of natural pearls as the material to be coated, and the desired properties to be provided.

The coating composition for forming membranes in this invention can contain various types of surface active agents for the purpose of improving the flow upon coating, thereby improving the smoothness of the coating membranes and reducing the friction coefficient at the surface of the coating membrane. Block or graft copolymers of dimethylsiloxane and alkylene oxide, fluorine type surface active agents are particularly effective. It is also possible to color the coating membrane by dispersing dyes or pigments therein, and to improve the practical properties of the coating composition such as coatability, adhesion with the substrate and other physical properties by dispersing filler or dissolving organic polymers therein. Furthermore, it is also possible to add an UV-absorbent for the purpose of improving the weather proofness and add an anti-oxidant for the purpose of improving the heat resistance.

For curing the coating composition according to this invention, it is possible to use various kinds of curing agents in combination in order to promote the curing and enabling the curing at low temperature. As the curing agent, various kinds of epoxy resin curing agents or organic silicon resin curing agents can be used.

Preferable examples of these curing agents include various kinds of organic acid an acid anhydrides thereof, nitrogen-containing organic compounds, metal complex compounds and metal alkoxides, as well as various kinds of salts such as organic carboxylates, carbonates and perchlorates of metals and radical polymerization initiators such as peroxides and azobisisobutyronitrile.

These curing agents may be used as a mixture of two or more of them. Among these curing agents, aluminium chelate compounds mentioned below are particularly useful for the purpose of this invention in view of the stability of composition and the coloration of the membrane after coating.

The aluminium chelate compounds mentioned herein are, for example, those aluminium chelate compounds represented by the following general formula (III);

$$AlX_nY_{3-n} \quad \text{(III)}$$

where X represents OL (L is a lower alkyl group), Y is at least one ligand selected from the ligands derived from the compounds represented by the general formula:

$$M^1COCH_2COM^2$$

(where $M^1$ and $M^2$ represent individually a lower alkyl group) and the ligands derived from the compounds represented by the general formula:

$$M^3COCH_2COOM^4$$

(where $M^3$ and $M^4$ represent individually lower alkyl group) and n is 0, 1 or 2.

Among the aluminium chelate compounds represented by the general formula (III), particularly preferable examples of the curing agent for this invention, in view of the solubility to the composition, stability and effect as the curing agent, include aluminium acetylacetonate, aluminium bis-ethylacetoacetatemonoacetylacetonate, aluminium di-n-butoxidemonoethylacetoacetate, aluminium di-isopropoxidemonomethylacetoacetate and the like. They can be used as a mixture of two or more of them.

The coating composition for this invention can be diluted with various kinds of solvents in order to improve the workability, to control the thickness of coating membrane, etc., and various diluting solvents can be used depending on the purposes, for example, water, alcohol, ester, ether, halogenated hydrocarbon, dimethylformamide, dimethylsulfoxide and the like. A mixed solvent may be also used as required.

When the composition contains finely particulate inorganic oxide, water, alcohol, dimethylformamide, ethylene glycol, diethlene glycol, triethylene glycol, benzyl alcohol, phenethyl alcohol, phenylcellosolve and the like are particularly preferable in view of the dispersability and the like.

The thickness of coating membrane comprising the curable composition based on organic materials thus formed should be from 0.01 μm to 30 μm. The thickness of the membrane herein means the average thickness at the surface of ornamental product. If the thickness of the coating membrane is less than 0.01 μm, no substantial effect can be obtained and thus no merit of this invention can be obtained. While on the other hand, if the thickness exceeds 30 μm, problems such as exfoliation and crack of coating membrane due to the difference in the heat coefficient between the coating membrane and the ornamental material as the substrate may result. Further, a thicker coating will cause the ununiformity of coating, and the loss in production thereby.

The surface to be coated is preferably cleaned by removal of contamination with a surface active agent, degreasing with an organic solvent and vapor cleaning with freon etc. Further, it is also effective to apply various types of pretreatment for the purpose of improving the adhesion and durability. As the pretreatment, the chemical treatment with an acid or alkali in suitable concentration is particularly preferable.

While there are various types of combinations as the embodiment of this invention, in one of the preferable embodiments, a coated ornamental article is obtained by the step of dyeing an ornamental material such as cultured pearl with a reactive dye such as a cationic dye and of coating it with the curable composition.

In another preferable embodiment of this invention, an ornamental article is coated with the curable composition containing the dyes for dyeing or coloring. Where the ornamental material is pearl, dye containing at least one fluorescent dye is particularly preferable, and those dyes having maximum absorption at the wavelength from 500–640 nm, more preferably from 540–600 nm, are used for getting high quality feeling.

EXAMPLES

This invention will now be described by way of the following examples for better understanding of the features of the invention, but this invention is in no way restricted only to these examples.

EXAMPLE 1

(1) Preparation of Coating Composition

Into a reactor containing a rotator and 95.3 g of γ-glycidoxypropyltrimethoxysilane, 21.8 g of 0.01N hydrochloric acid solution was added dropwise at 10° C. under stirring with a magnetic stirrer. The stirring was continued for an additional 30 minutes to obtain a hydrolysate.

To the hydrolysate obtained above, 216 g of methanol, 216 g of dimethylformamide, 0.5 g of a fluorine type surface active agent and 67.5 g of bisphenol A epoxy resin (Epicoat 827: a trade name of product manufactured by Shell Chemical Co.) were added, and then, 270 g of a colloidal sol of antimony pentoxide (Antimon sol A-2550: a trade name of product manufactured by Nissan Kagaku Co., 60 nm in average particle size) and 13.5 g of aluminium acetyl acetonate were added. The mixture was stirred sufficiently to obtain a coating composition.

(2) Coating of Pearls

Bleached and bored cultured pearls at stage 2 years (5 mm in diameter) were coated with the coating composition prepared in (1) above by manual dip coating, and then dried for 20 minutes in a hot blow drier at 50° C. as the primary drying and further heating to dry in a hot blow recycling drier at 50° C. for 20 hours to obtain pearls having coating membranes. Coating thickness was 2.5 μm.

EXAMPLE 2

(1) Preparation of Coating Composition

To 92.2 g of hydrolysate prepared in the same manner as in Example 1 (1), 130.2 g of N,N-dimethylformamide and then 35.5 g of novolak type epoxy resin (Epicoat 152: a trade name of product manufactured by Shell Chemical Co.) were added. Further, 236 g of colloidal silica dispersed in methanol was added, and then 0.7 g of a silicone type surface active agent and 7.1 g of aluminium acetylacetonate were added. The mixture was stirred sufficiently to obtain a coating composition.

(2) Coating of Pearls

All of the same procedures as those of Example 1 (2) were repeated except that the drying temperature was 90° C., to obtain pearls having coating membranes. Coating thickness was 1.8 μm.

Evaluation

The pearls having coating membranes obtained in Examples 1 and 2 had improved luster and higher quality as compared with pearls without coating. Among all, those containing the colloidal sol of antimony pentoxide in the coating composition had the best luster, a clear color and high quality.

When the pearls obtained in Examples 1 and 2 were slightly rubbed with finger nails, no scratch was observed in them. This showed high surface hardness thereof.

Furthermore, when the pearls obtained Examples 1 and 2 were immersed in distilled water at 40° C. for one hour, both of them possessed the coating membranes after the immersion, which showed excellent water proofness as well.

EXAMPLE 3

(1) Preparation of Coating Composition

Into a breaker containing 50.01 parts of γ-glycidoxypropyltrimethoxysilane, 11.5 parts of 0.01N hydrochloric acid was added dropwise at 10° C. to carry out hydrolysis. The stirring was continued for additional 30 minutes to obtain hydrolysate.

To a beaker containing 106.5 parts of bisphenol A type epoxy resin (Epicoat 827: a trade name of product manufactured by Shell Chemical Co.), 309.4 parts of N,N-dimethylformamide was added and the mixture was stirred to obtain a solution. Then, the silane hydrolysate obtained above was added and the mixture was stirred. Further, 0.8 parts of a silicone surface active agent and 7.1 parts of aluminium acetylacetonate were added and the mixture was stirred sufficiently to obtain a coating composition.

(2) Coating of Pearls

Bleached and bored cultured pearls at 2 years stage (5 mm in diameter) were coated with the coating composition prepared in (1) above by float coating with an air stream at 90° C. and dried for 20 minutes. Further, they were heated to dry in a hot blow recycling drier at 90° C. for 20 hours to obtain pearls having coating membranes. Coating thickness was 2.0 μm.

Evaluation

The pearl obtained in Example 3 had significantly improved luster and high quality as compared with pearls without coating. When it was immersed in distilled water at 40° C. to observe the state of coating membranes, no separation of the membrane was observed after immersion of one hour and the pearl possessed coating membrane even after immersion of additional 10 hours to show excellent water proofness.

EXAMPLE 4

A coating composition was prepared in the same manner as in Example 3 except that the epoxy resin was a hydrogenated bisphenol A epoxy resin (Epichlon 750: a trade name of product manufactured by Dainihon Ink K.K.) and that N,N-dimethylformamide was replaced with ethanol. As a result, a coated pearl of substantially same grade with that of Example 3 could be obtained even in case that the heating temperature was lowered to 50° C. Coating thickness was 1.5 μm.

EXAMPLE ≡

A coating composition was prepared by adding 90 ppm of a fluorescent cationic dye (Cathilon Brill Pink CD-BH: a trade name of product manufactured by Hodogaya Kagaku Industry K.K., absorption maximum at 562 nm) to the coating composition of Example 4. The coating composition was applied to pearls which had been subjected to bleaching only, and cured in the same manner as Example 4. Thus obtained pearls had pinky fluorescent color and very high quality feeling. The properties of coating membrane were substantially same with those of Example 4.

EXAMPLE 6

All of the same procedures as those of Example 4 were carried out except that pearls were dyed with a pink cationic dye before the coating. Thus obtained pearls had more clear pink color and higher quality in addition to the properties of pearls of Example 4.

EXAMPLE 7

(1) Preparation of Coating Composition

Into a beaker containing 121.5 parts of γ-glycidoxypropyltrimethoxysilane, 27.7 parts of 0.01N hydrochloric acid was added dropwise at 10° C. to carry out hydrolysis. The stirring was continued for additional 30 minutes to obtain hydrolysate. Then, 142.4 parts of methanol, 5.4 parts of a silicone surface active agent and 4.29 parts of aluminium acetylacetonate were added to the hydrolysate and the mixture was stirred sufficiently to obtain a coating composition.

(2) Coating of Pearls

Bleached and bored cultured pearls at 2 years stage were coated with the coating composition prepared in (1) above by manual dip coating. Then, they are heated to dry in a hot blow recycling drier at 50° C. for 24 hours to obtain pearls having coating membranes.

Evaluation

The pearl obtained in Example 7 had significantly improved luster and high quality as compared with pearls without coating. When it was ground for 30 minutes with an abrasive comprising a major amount of rock salt, no change of the membrane was observed after abrasion to show excellent abrasion resistance. Coating thickness was about 2.5 μm.

COMPARISON EXAMPLE 1

All of the same procedures as those of Example 7 were repeated except that a coating composition was prepared by adding 854 parts of methanol to the coating composition of Example 7 and stirring the mixture sufficiently.

The coating thickness of thus obtained pearl was 0.005 μm, and no improvement of luster or quality was observed as compared with pearls without coating.

COMPARISON EXAMPLE 2

All of the same procedures as those of Example 7 were repeated except that 10 % solid content of acrylic resin solution in methylisobutyl ketone was used as a coating composition.

While some improvement of luster could be observed, the coating membranes were completely removed off after 10 minutes of abrasion test to show very poor durability thereof.

What is claimed is:

1. An ornamental article comprising a natural or cultured pearl and a cured coating membrane, said cured coating membrane having been derived from a curable composition based on organic materials, said cured composition being coated on the surface of said natural or cultured pearl in a thickness form 0.01 μm to 30 μm, wherein one of the ingredients of said curable cured composition is an organopolysiloxane obtained from one or more silicon compounds represented by the following general formula I and hydrolysate thereof;

$$R^1_aR^2_bSi(OR^3)_{4-(a+b)} \quad (I)$$

wherein $R^1$ and $R^2$ independently represent an alkyl, alkenyl, aryl or a hydrocarbon group having a halogen atom or an epoxy, glycidoxy, amino, mercapto, methacryloxy or cyano group, $R^3$ represents a $C_{1-8}$ alkyl, alkoxyalkyl, acyl of aryl group, or mixtures thereof, and a, and b independently represent 0 or 1 and another ingredient of said cured composition is an epoxy resin compound.

2. The ornamental article as defined in claim 1, wherein said curable composition contains fine inorganic particles.

3. The ornamental article as defined in claim 2, wherein said fine inorganic particles are selected from the group consisting of silica, titania, zirconia, antimony oxide, alumina and tantalum oxide or mixtures thereof.

4. The ornamental article as defined in claim 2, wherein said fine inorganic particles were derived from a colloidally dispersed sol, and said fine inorganic particles are selected from the group consisting of silica, titania, zirconia, antimony oxide or alumina or mixtures thereof.

5. The ornamental article as defined in claim 1, wherein said coating membrane is dyed or colored.

6. The ornamental article as defined in claim 1, wherein said natural or cultured pearl is dyed or colored.

7. The ornamental article as defined in claim 1, wherein said coating membrane is a cured film containing a finely particulate inorganic oxide.

8. The ornamental article as defined in claim 7, wherein said epoxy resin compound has a cycloaliphatic or an aromatic ring.

9. The ornamental article as defined in claim 7, wherein said coating membrane contains aluminium derived from a curing agent of an aluminium chelate compound.

10. The ornamental article as defined in claim 7, wherein said natural or cultured pearl or said coating membrane is dyed or colored with an organic dye.

11. The ornamental article as defined in claim 10, wherein said organic dye comprises at least one fluorescent dye.

12. The ornamental article as defined in claim 11, wherein said organic dye comprises at least one dye having a maximum absorption in the range of from 500 nm to 640 nm.

13. An ornamental article comprising a natural or cultured pearl and a cured coating membrane, said cured coating membrane being a cured film derived from a composition containing the following ingredients:

A. one or more silicon compounds represented by the following general formula and/or a hydrolysate thereof:

$$R^1_aR^2_bSi(OR^3)_{4-(a+b)}$$

wherein $R^1$ and $R^2$ independently represent an alkyl group, an alkenyl group, an aryl group or a hydrocarbon group having a halogen, epoxy, glycidoxy, amino, mercapto, methacryloxy or cyano group, $R^3$ represents a $C_{1-8}$ alkyl, alkoxyalkyl, acyl or aryl group, and a and b independently represent 0 to 1;

B. an epoxy resin compound having a cycloaliphatic of aromatic ring; and optionally, C. finely particulate inorganic oxides;

and wherein said natural or cultured pearl or said coating membrane is dyed or colored with at least one fluorescent dye having a maximum absorption in the range of from 500 nm to 640 nm.

14. An ornamental article comprising a natural or cultured pearl and a cured coating membrane, said cured coating membrane being a cured film derived from a composition containing the following ingredients:

A. an organopolysiloxane obtained from one or more silicon compounds represented by the following general formula I and hydrolysate thereof:

$$R^1_aR^2_bSi(OR^3)_{4-(a+b)} \quad (I)$$

wherein $R^1$ and $R^2$ independently represent an alkyl, alkenyl, aryl or a hydrocarbon group having a halogen atom or an epoxy, glycidoxy, amino, mercapto, methacryloxy or cyano group, $R^3$ represents a $C_{1-8}$ alkyl, alkoxyalkyl, acyl or aryl group, and a and b independently represent 0 or 1;

B. an epoxy resin compound having a cycloaliphatic or aromatic ring; and optionally, C. finely particulate inorganic oxides;

and wherein said natural or cultured pearl or said coating membrane is dyed or colored with at least one fluorescent dye having a maximum absorption in the range of from 500 nm to 640 nm.

* * * * *